No. 679,321. Patented July 30, 1901.
F. MACKINTOSH.
AUTOMATIC SWITCH.
(Application filed May 1, 1899.)
(No Model.) 2 Sheets—Sheet 1.
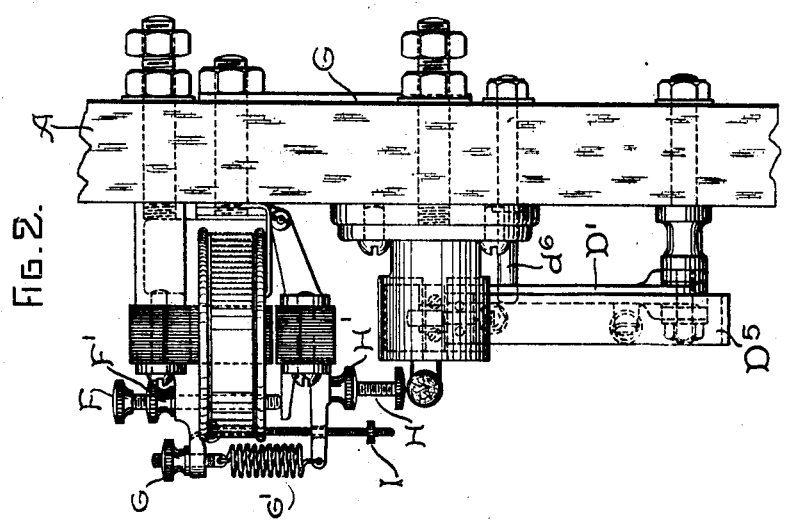
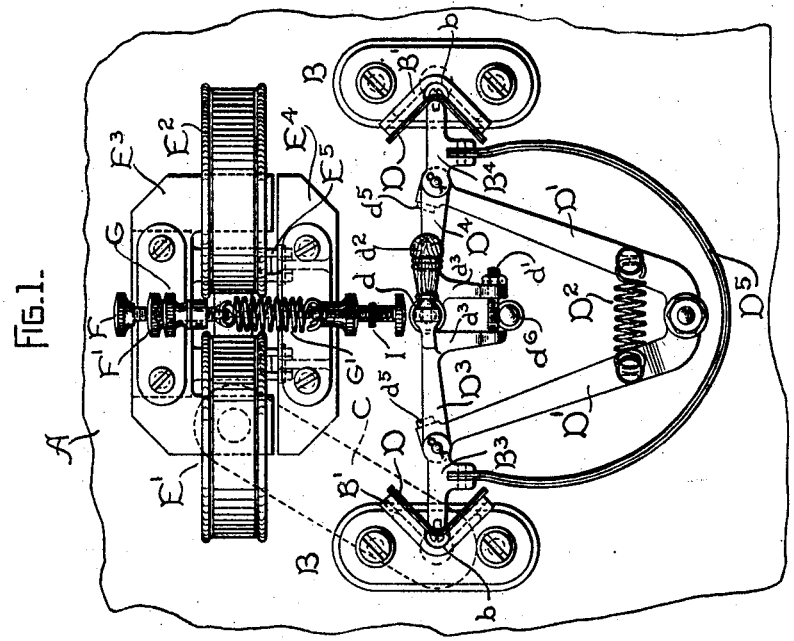
WITNESSES. INVENTOR.
Frederick Mackintosh
by Albert G. Davis
Att'y.

No. 679,321. Patented July 30, 1901.
F. MACKINTOSH.
AUTOMATIC SWITCH.
(Application filed May 1, 1899.)
(No Model.) 2 Sheets—Sheet 2.
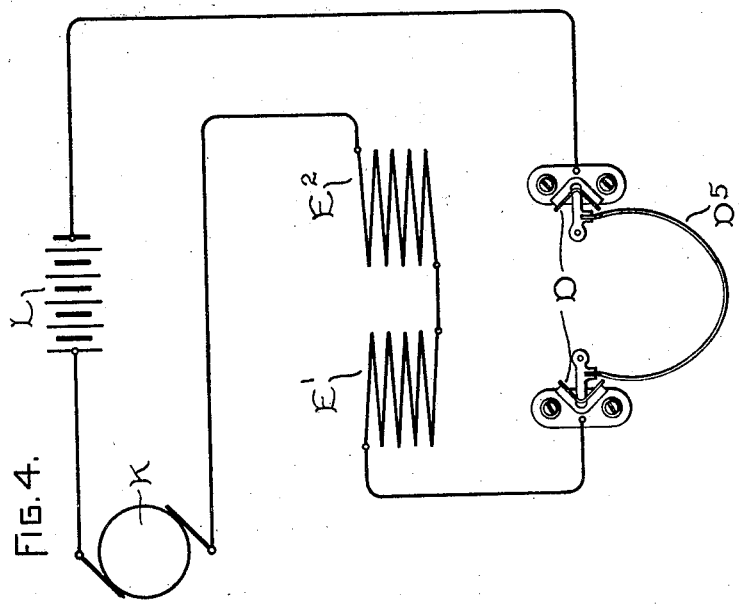
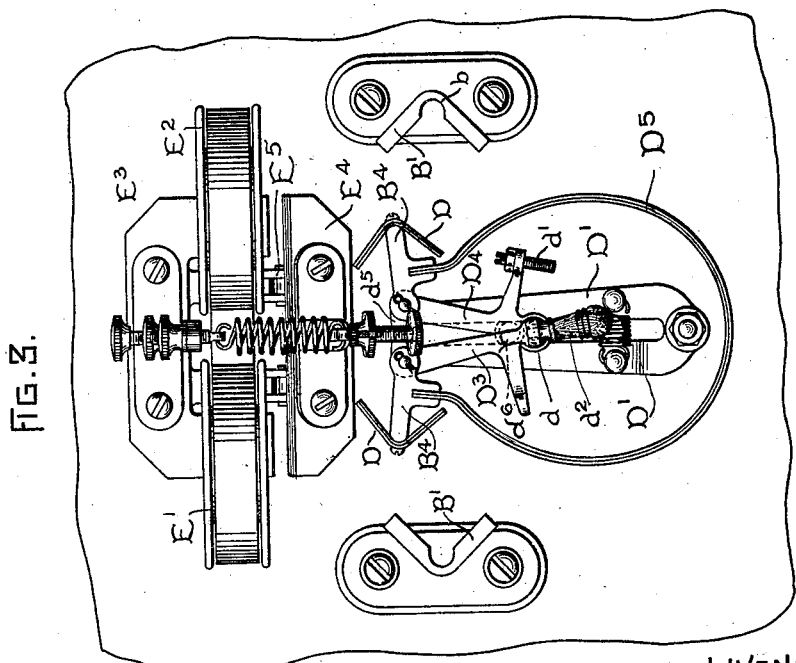
WITNESSES.
Ernst Altenpohl
A. F. Macdonald.
INVENTOR.
Frederick Mackintosh.
by Albert G. Davis
Att'y.

UNITED STATES PATENT OFFICE.

FREDERICK MACKINTOSH, OF SCHENECTADY, NEW YORK, ASSIGNOR TO THE GENERAL ELECTRIC COMPANY, OF NEW YORK.

AUTOMATIC SWITCH.

SPECIFICATION forming part of Letters Patent No. 679,321, dated July 30, 1901.

Application filed May 1, 1899. Serial No. 715,087. (No model.)

*To all whom it may concern:*

Be it known that I, FREDERICK MACKINTOSH, a citizen of the United States, residing at Schenectady, county of Schenectady, State of New York, have invented certain new and useful Improvements in Automatic Switches, (Case No. 826,) of which the following is a specification.

This invention relates to automatic switches for controlling electric circuits, the object being to vary the connections of a circuit upon a definite range of variation in the electric energy it carries. In a more specific sense, the invention is directed to the opening of a circuit upon a definite and predetermined reduction of current strength in order to cut off the current-supply upon a definite decrease of load. As will be hereinafter seen, however, the apparatus might also be employed to change the circuit connections upon increase of load above a definite maximum value. The type of apparatus herein shown is particularly applicable to use as a charging-switch for storage batteries, serving to open the charging-circuit and cut off the batteries therefrom when they are sufficiently charged and their counter electromotive force rises to a desired value.

In carrying out the invention I support within the field of an electromagnet an armature suspended by a spring the tension of which acts to assist the pull of the magnet and provide adjusting devices by which the width of the air-gap between the armature and the magnet-poles may be nicely adjusted to vary the point at which the switch will act. By such an organization I provide a retractile force for the armature of a constant and invariable value, the only function of the spring being to yieldingly support the armature within the magnetic field, and thus the point of operation of the magnet, and therefore of the switch which it controls, can be made more precise than if the magnet and armature were provided with an elastic retractile agency. This organization of the magnet and its armature differs, therefore, materially from the construction usually employed, wherein a spring is used to retract the armature and which must of necessity be more or less variable by reason of a change in tension of the spring under the influence of variations of temperature or molecular or other changes due to long periods of service.

In connection with the novel electromagnetic controlling device hereinabove briefly described I provide a novel switch construction mechanically considered. The organization comprises two switch arms or levers journaled upon a common bearing and adapted to be drawn together by a spring, the levers carrying brushes or contacts adapted to engage the terminals of an electric circuit. At or near the point where the brushes are mounted are links pivoted to the switch-levers, the links being jointed together at their contiguous extremities, thus forming a quadrilateral or quadrangular system of levers pivoted together at the junctions of all sides. The joint between the two links which connect the levers is adapted to fold inwardly, so as to form a reëntrant angle when the switch opens or collapses and capable also of being spread by a handle at or near the joint, so that the joint lies in or above the line connecting the links. The links, in effect, constitute a toggle, which when set on a line above or connecting the centers of the pivots in the switch-levers spreads the latter against the tension of the controlling-spring and closes the circuit. When, however, the toggle-joint is pressed below the pivotal centers of the links, the effect of the spring causes the switch-jaws to converge toward a common central line, and thus open the switch at two points by withdrawing both contacts from the terminals. A handle mounted on one of the arms at or near the toggle-joint permits the switch to be set. I provide for its automatic release by permitting the magnet-armature when actuated by the predetermined circuit condition for which it is set to strike the toggle and by the impact of the blow drop the joint below the line of the centers, thus permitting the spring to draw the switch levers or jaws together and open the circuit.

My invention therefore comprises a magnetic controlling device for a switch or any other translating device in which an armature is suspended within a magnetic field under a bias of perfectly-constant value, such as a weight tending to withdraw it from the field on a definite decrease of magnetic flux, and adjusting devices for varying the width of the air-gap between the armature and the magnet-poles.

It comprises, further, a switch actuated by such a magnet.

It comprises also a toggle-controlled switch consisting of a quadrilateral system of levers all jointed together, the joint which constitutes the toggle being capable of opening inwardly to form a reëntrant angle in the quadrangular system, the switch-contacts being mounted at points adjacent to the toggle-arms, the normal tendency or bias toward collapsing being afforded by a spring mounted upon two arms of the lever system.

The invention comprises also other more specific features, which will be hereinafter more fully described and will be definitely indicated in the claims appended to the specification.

In the drawings which illustrate the invention, Figure 1 is a front elevation of a switch embodying my improvements. Fig. 2 is a side elevation. Fig. 3 is a view similar to Fig. 1, the switch being shown open; and Fig. 4 is a diagram of the circuit connections, showing the relations of my switch to a charging-circuit for a storage battery.

A represents a base or supporting-frame, upon which the parts of the apparatus are mounted and which should be made of insulating fireproof material, as is the usual practice in constructing this class of apparatus.

B B represent the circuit-terminals, integral with which are formed angular contact-studs B' B'. Upon a stud mounted on an insulating-support are pivoted two switch-arms D' D', connected together by a coil-spring $D^2$, tending to converge them to a position of approximate parallelism. Pivotally mounted on the outer ends of the switch-levers D' D' are two metallic arms $D^3$ $D^4$, on the other ends of which are carried elastic brushes D D, formed of a plurality of laminæ of phosphor-bronze or other good conducting material not materially influenced by heat. These brushes may be screwed to the ends of the arms $B^3$ $B^4$, and in the angular contacts which form the terminals of the circuit a recess $b$ may be provided to admit the screwheads. The arms $B^3$ $B^4$ are connected together by a bridging-conductor $D^5$, formed of several thicknesses of sheet metal, such as phosphor-bronze, which affords a by-pass around the joints for the current and prevents heating said joints and which has sufficient resilience to maintain the brushes D D in horizontal position. The levers D' D' are connected by two links $D^3$ $D^4$, which in turn are pivoted together to form a toggle-joint, two downwardly-depending lugs $d^3$ $d^3$ integral with the respective links being provided for the purpose of regulating the toggle and rendering it more or less sensitive. This may be effected by means of a set-screw $d'$, by which the adjustment may be varied, a matter which will be sufficiently evident from an inspection of the drawings. A stud $d^6$ is mounted centrally on the supporting-plate and projects outwardly into the path of the levers D' D' and prevents the lever system when the switch collapses from tilting toward one side, thus insuring the rupture of the circuit at both contacts. A handle $d^2$ is provided at or near the toggle-joint for setting the switches. Cushions $d^5$ $d^5$, of soft rubber, mounted on the ends of the lever-arms D' D', permit the arms to come together quietly and without shock when the switch is released. The toggle is controlled by an electromagnet E' $E^2$, the core $E^3$ of which is laminated and which coöperates with the laminated armature $E^4$, mounted upon a pivot at the rear and engaging in its forward position the tip of the contact-screw F, which regulates the width of the air-gap and the point at which the magnet will drop off the armature. A spring G', controlled by an adjusting-screw, is mounted to assist the pull of the magnet in controlling the armature. Both adjusting-screws are provided with lock-nuts F' G to prevent them from working loose after having been adjusted. The armature carries an adjustable pin H and a lock-nut H' for said pin, mounted in such a position that in the sweep of the armature when released the head of the pin H will strike the toggle-joint and release the switch, permitting its spring $D^2$ to collapse it. A pivoted and threaded rod I, provided with a nut, constitutes an adjustable back-stop for the armature, the rod threading a hole formed in a bar forming part of the armature structure.

A switch of the kind herein described may be used for a variety of purposes, and I do not restrict myself to any particular application. An organization for use with storage batteries is shown diagrammatically in Fig. 4, in which K represents a charging source or generator, L a storage battery, E' $E^2$ the controlling-magnet, and D $D^5$ the switch.

It will be readily seen that when the battery has been charged to the predetermined point for which the switch was set its counter electromotive force will cause a determinate reduction in the current strength flowing in the circuit, thus permitting the magnet to drop off its armature and release the switch. The apparatus might also be used to operate at a predetermined maximum of current strength, the armature then being drawn up to the magnet and inverted with respect to the position illustrated, so that its forward pull will cause the pin to strike the toggle-joint.

It is obvious that changes of potential as well as current might also be controlled by the apparatus by suitably arranging the magnet-windings to coöperate with such changes of potential.

What I claim as new, and desire to secure by Letters Patent of the United States, is—

1. A controlling-magnet for a translating device, comprising a coil and retractile armature governed thereby, having a determinate retractile force and an adjusting-spring of weaker power opposing said retractile force.

2. In an automatic switch, the combination of an electromagnet, an armature of definite weight supported in a magnetic field by the combined effect of magnetism and an elastic support, and an electric switch provided with a tripping device within the path of said armature when released.

3. A switch for electric circuits, comprising two switch-levers provided with a normal elastic bias tending to draw them together, independent contacts mounted on the outer parts of the levers and coöperating with the terminals of an electric circuit, and a toggle connecting the levers.

4. A switch for electric circuits, comprising two switch-arms tending to collapse toward a line of parallelism when free, a toggle for spreading the arms, independent switch-contacts mounted at or near the ends of the arms, and a flexible electric bridge connecting the contacts to afford a by-pass around the joint.

5. A switch for electric circuits, comprising switch-arms tending to collapse elastically when free, a toggle connecting the arms together, and lugs, as $d^3$, $d^3$, on the opening side of the toggle, provided with an adjusting-screw for varying the sensitiveness of the switch.

6. A switch for electric circuits, comprising two elastically-spreading switch-arms carrying elastic contacts, angular or bent contact-terminals coöperating therewith, an electric bridge of good conducting material between the elastic contacts, and a stud mounted on the base and projecting in the path of the switch-arms to promote the folding of the arms centrally between the circuit-terminals.

7. The combination of a toggle-operated electric switch, an electromagnet capable of operating its armature upon a predetermined fluctuation of current, and an arm carried by the armature and sweeping the path of a tripping device for the toggle but normally free from engagement therewith.

8. In an automatic switch, the combination with a magnet-armature having a uniform retractile agent, as a weight, and a toggle-controlled electric switch, the toggle of which lies in the path of the armature when released but is normally disengaged therefrom, thereby permitting momentum to be stored to trip the toggle.

9. The combination in a circuit-breaker, of stationary contacts forming the terminals of the circuit to be opened or closed, a pair of arms pivoted at a common center and carrying contacts for bridging the terminals when the arms are open, a toggle for spreading the arms and forcing the movable contacts into close connection with the stationary terminals, a spring for drawing the arms together, and a trip mechanism responsive to the current.

10. In a circuit-breaker, the combination of the stationary terminals, pivoted arms carrying flexible contacts, which, with the stationary terminals, complete the circuit, a toggle for spreading the arms apart, arranged to cramp above the center, a spring for drawing the arms together and thus breaking the circuit, and a tripping mechanism responsive to the current in the circuit for forcing the toggle over the center so as to bring the spring into action.

11. The combination in an underload-circuit breaker, of an electromagnet and its armature, with a spring assisting the magnet to hold the armature in its attracted position, and means for changing the reluctance of the magnetic circuit.

12. The combination in an underload-circuit breaker, of the toggle mechanism holding contacts closed to complete the circuit, the armature and the electromagnet, and the adjustable screw upon the armature by which the toggle is thrown to one side of the center.

In witness whereof I have hereunto set my hand this 28th day of April, 1899.

FREDERICK MACKINTOSH.

Witnesses:
BENJAMIN B. HULL,
MABEL E. JACOBSON.